United States Patent
Murphy et al.

(10) Patent No.: US 9,595,985 B1
(45) Date of Patent: Mar. 14, 2017

(54) POWER REDUCTION IN NOISE-CANCELLING RECEIVERS

(71) Applicant: Broadcom Corporation, Irvine, CA (US)

(72) Inventors: David Murphy, Costa Mesa, CA (US); Hao Wu, Irvine, CA (US); Hooman Darabi, Laguna Niguel, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/882,836

(22) Filed: Oct. 14, 2015

Related U.S. Application Data (60) Provisional application No. 62/235,894, filed on Oct. 1, 2015.

(51) Int. Cl.
H04B 1/10 (2006.01)
H04B 15/00 (2006.01)
H04B 1/12 (2006.01)

(52) U.S. Cl.
CPC ................ *H04B 1/10* (2013.01); *H04B 1/12* (2013.01); *H04B 15/00* (2013.01)

(58) Field of Classification Search
CPC ............. H04B 1/10; H04B 1/12; H04B 15/00
USPC ........................................ 455/296, 303, 305
See application file for complete search history.

(56) References Cited

U.S. PATENT DOCUMENTS

| | | | | |
|---|---|---|---|---|
| 9,031,529 | B2* | 5/2015 | Murphy | H04B 1/30 455/323 |
| 2012/0238232 | A1* | 9/2012 | Murphy | H04B 1/16 455/326 |
| 2012/0293265 | A1* | 11/2012 | Heikkinen | H03F 1/565 330/291 |
| 2013/0271213 | A1* | 10/2013 | Chung | H03F 1/26 330/149 |
| 2014/0018028 | A1* | 1/2014 | Lemkin | H03D 7/1441 455/269 |
| 2014/0045443 | A1* | 2/2014 | Rofougaran | H04B 1/1036 455/131 |
| 2014/0057584 | A1 | 2/2014 | Murphy et al. | |
| 2014/0169231 | A1* | 6/2014 | Mikhemar | H04B 1/525 370/277 |
| 2014/0171006 | A1 | 6/2014 | Murphy et al. | |
| 2014/0355728 | A1* | 12/2014 | Liao | H04B 1/10 375/346 |
| 2015/0333718 | A1* | 11/2015 | Lemkin | H03G 3/20 455/234.1 |
| 2016/0112082 | A1* | 4/2016 | Lemkin | H03D 7/1441 455/269 |

OTHER PUBLICATIONS

Darabi, H., et al., Blocker Tolerant Software Defined Receivers, Sep. 22, 2014, pp. 35-42, Institute of Electrical and Electronics Engineers (IEEE), Piscataway, New Jersey.

(Continued)

*Primary Examiner* — Duc M Nguyen
(74) *Attorney, Agent, or Firm* — Foley & Lardner LLP (57) ABSTRACT

Recently proposed noise-cancelling receivers report a best case trade-off between noise figure and linearity for a matched wideband receiver. These receivers are further improved using a passive front-end gain. The front-end gain reduces the power requirements of the radio frequency transconductance stage, and potentially other stages where, e.g., smaller mixer switches may be employed.

20 Claims, 5 Drawing Sheets

(56) References Cited

OTHER PUBLICATIONS

Murphy, D., et al., Advances in the Design of Wideband Receivers, 2013, pp. 1-8, Institute of Electrical and Electronics Engineers (IEEE), Piscataway, New Jersey.

Murphy, D., et al., A Blocker-Tolerant Wideband Noise-Cancelling Receiver with a 2dB Noise Figure, 2012 IEEE International Solid-State Circuits Conference, pp. 74-76, Institute of Electrical and Electronics Engineers (IEEE), Piscataway, New Jersey.

Murphy, D., et al., A Blocker-Tolerant, Noise-Cancelling Receiver Suitable for Wideband Wireless Applications, Dec. 2012, pp. 2943-2963, vol. 47, No. 12, IEEE Journal of Solid State Circuits, Institute of Electrical and Electronics Engineers (IEEE), Piscataway, New Jersey.

Murphy D., et al., An LTV Analysis of the Frequency Translational Noise-Cancelling Receiver, Jan. 2014, pp. 266-279, vol. 61, No. 1, IEEE Transactions on Circuits and Systems—I: Regular Papers, Institute of Electrical and Electronics Engineers (IEEE), Piscataway, New Jersey.

Murphy, D., et al., A Noise-Cancelling Receiver with Enhanced Resilience to Harmonic Blockers, Feb. 10, 2014, pp. 68-70, 2014 IEEE International Solid-State Circuits Conference, Institute of Electrical and Electronics Engineers (IEEE), Piscataway, New Jersey.

\* cited by examiner

POWER REDUCTION IN NOISE-CANCELLING RECEIVERS

PRIORITY CLAIM

This application claims priority to provisional application Ser. No. 62/235,894, filed Oct. 1, 2015, which is entirely incorporated by reference.

TECHNICAL FIELD

This disclosure relates to the antenna interface to a noise cancelling receiver.

BACKGROUND

Rapid advances in electronics and communication technologies, driven by immense customer demand, have resulted in the widespread adoption of devices such as smart phones, tablet computers, and network peripherals that employ wireless receivers. In most of such devices, energy consumption is of interest, and reduced energy consumption is often a design goal. At the same time, the wireless receivers must perform well even in difficult operating environments.

DETAILED DESCRIPTION

Recently proposed noise-cancelling receivers provide the best trade-off between noise figure and linearity for a matched wideband receiver. These noise-cancelling receivers are presented in, for instance, Murphy, et al, *A Blocker-Tolerant Wideband Noise-Cancelling Receiver with a 2 dB Noise Figure*, IEEE International Solid-State Circuits Conference, pp. 74-76, February 2012; U.S. Pat. Pub. No. 2014-0171006; U.S. Pat. Pub. No. 2014-0057584; and U.S. Pat. Pub. No. 2014-0045443. The noise-cancelling receivers include, among other circuitry, a radio-frequency (RF) transconductance (GM) stage, baseband transimpedance amplifiers (TIAs), and local oscillator generators (LOGENs). All of the circuitry, and particularly the RF-GM stage, consumes power.

The circuit designs discussed below apply a passive front-end gain to the received signal prior to the noise cancelling receiver (RX). The passive front-end gain reduces the power consumption requirements of the RF-GM stage. The passive front-end may also reduce the power consumption of the baseband TIAs and LOGEN path, given the smaller mixer switches that may be used. The circuit configuration of a passive front-end gain prior to a noise-cancelling receiver has never been previously documented. This is due to (at least in part) to the intricacies of noise-cancelling receiver designs and the non-obvious affects that passive gain has on the designs. In the same way that a noise-cancelling RX is superior to all other known wideband receivers in terms of noise, linearity, and matching, a noise-cancelling RX with passive gain is superior to all other known narrowband receivers in terms of noise, linearity, and matching. The circuit designs discussed below provide a lower-power narrowband noise-cancelling receiver that maintains a low-noise figure and excellent linearity.

Figure 1:
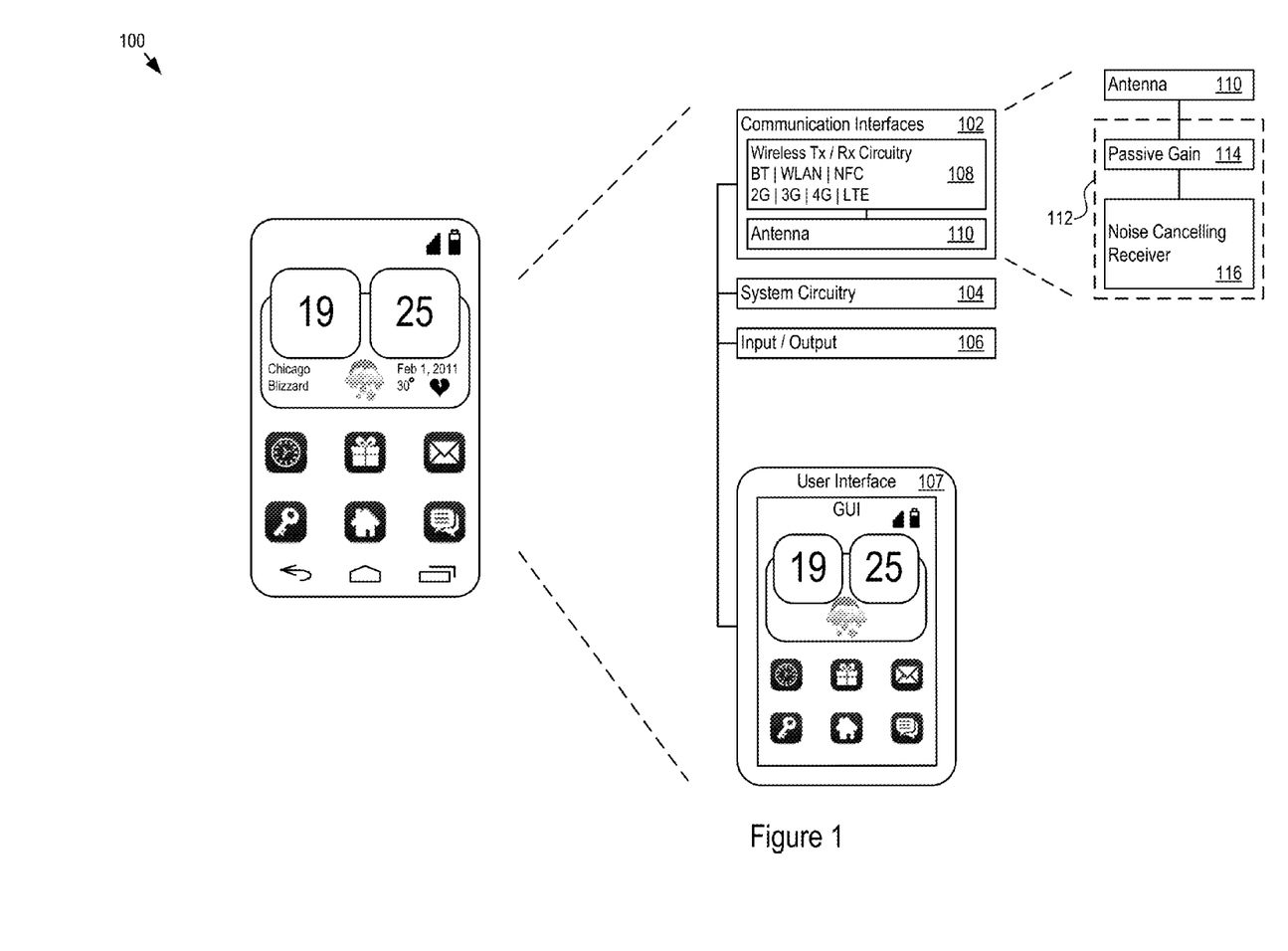
FIG. 1 shows an example communication device with an enhanced noise-cancelling receiver circuit.

FIG. 1 shows an example device 100 with an enhanced noise-cancelling receiver circuit. The device 100 is a smart phone in this example, but the device 100 could be any type of device that wirelessly receives signals. The device 100 includes device circuitry that implements any desired functionality. Examples of device circuitry in FIG. 1 include the communication interfaces 102, system circuitry 104, I/O circuitry 106, and user interfaces 107. The system circuitry 104 may be implemented, for example, with one or more systems on a chip (SoC), application specific integrated circuits (ASIC), central processing units (CPUs), discrete analog and digital circuits, and other circuitry. The I/O circuitry 106 may include general purpose I/O circuitry, e.g., for universal serial bus (USB) I/O, audio output, microphone input, or for implementing a flash memory expansion card interface. The user interfaces 107 may include a display, e.g., a touch sensitive display, on which the system circuitry 104 renders a graphical user interface (GUI) to facilitate device operation.

In the example shown in FIG. 1, the communication interfaces 102 include wireless transceiver circuitry 108. The wireless transceiver circuitry 108 processes signals that the antenna 110 receives. As will be described in more detail below, the communication interfaces 102 include one or more instances wireless transceivers and antennas with enhanced receiver circuitry 112. The enhanced receiver circuitry 112 includes a passive gain front-end 114 to a noise cancelling receiver 116.

Figure 2:
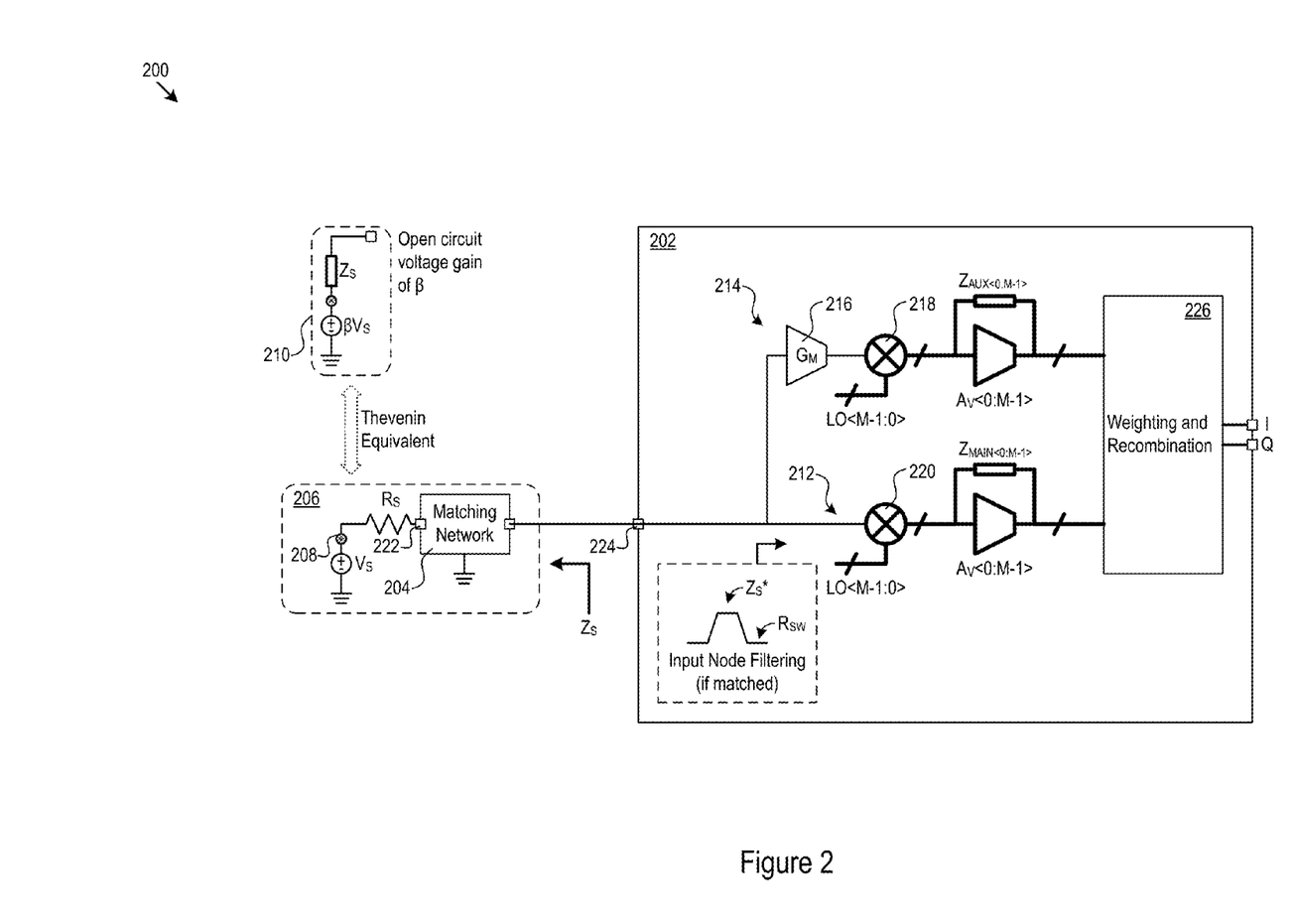
FIG. 2 shows an example circuit including a noise-cancelling receiver with passive front-end gain.

FIG. 2 shows an example 200 of the enhanced receiver circuitry 112. The example 200 includes a noise-cancelling receiver 202 and passive front-end gain implemented with the matching network 204. The noise-cancelling receiver 202 may operate over any selected frequency range, e.g., 0 to 3 GHz, and the frequency range may be narrowed in response to the matching network 204. In FIG. 2, the matching network 204 is part of a circuit model 206 of an antenna, noise source, and the matching network 204. In particular, the circuit model 206 models an antenna generating the ideal received signal $V_S$ and resistance $R_S$. The circuit model 206 includes a noise source 208.

The circuit model 206 has a corresponding Thevenin equivalent model 210. The Thevenin equivalent model 210 characterizes the combination of the antenna, noise source and the matching network 204. In particular, the Thevenin equivalent model 210 indicates that the combination has an open circuit voltage gain of beta, $\beta$ and a series impedance of $Z_S$. The matching network 204 is chosen to provide a passive voltage gain (i.e., $\beta > 1$), with corresponding reduction in current so that there is no net power consumption across the matching network 204. In sharp contrast to prior designs in which the matching network was a unity gain matching network, the passive gain of more than 1 provided by the matching network 204 reduces a noise cancelling current requirement in the noise-cancelling receiver 202 by more than $\beta$, e.g., by $\beta^2$.

The noise-cancelling receiver 202 includes two distinct downconversion paths: a main path 212 that provides impedance matching and current measurement, and an auxiliary path 214 with a transconductance stage 216 that provides a measure of the voltage at the RF input. Each path includes multiple mixer outputs and subsequent individual processing stages. The multiple path design is denoted in FIG. 2 with the notation <0:M−1>, e.g., M=8. In some implementations, the impedance looking into the main path 212 is configured to be the complex conjugate of $Z_S$, to provide an impedance match to the circuitry providing signals to the receiver input port 224.

The oscillator circuitry 218 and 220 changes frequency to change the center frequency of the noise-cancelling receiver 202, which provides a low noise figure with excellent linearity over a wide bandwidth (e.g., 0 to 3 GHz). A subsequent weighting and recombination stage 226 generates the inphase and quadrature outputs representing the noise-cancelled received signal. Specific implementation details of the noise-cancelling receiver 202 may be found in, e.g., Murphy, et al, *A Blocker-Tolerant Wideband Noise-Cancelling Receiver with a 2 dB Noise Figure*, IEEE International Solid-State Circuits Conference, pp. 74-76, February 2012.

One aspect of the noise-cancelling receiver 202 is its noise figure. When the matching network 204 is not used, the noise figure, F, is given by the expression:

$$F \approx \left(1 + \left(\frac{\gamma}{G_M R_S}\right)\right)$$

with overall system gain:

$$A_v \approx G_M Z_{AUX}$$

In the expression above, γ is a technology-fixed constant, e.g., about (⅔) depending on the particular design of the transconductance stage 216. The expression for the noise figure indicates that increasing $G_M$ will beneficially drive the noise figure to 1, the ideal value. In some systems in which power consumption is not a concern, the circuit design may make $G_M$ very large. However, $G_M$ is directly proportional to current, and as a result, increasing $G_M$ quickly increases power consumption. Not every design can afford the resulting increase in power consumption.

The matching network 204 provides a solution to increased power consumption. The matching network 204 provides a passive voltage gain to the signal received by the antenna. That is, the matching network 204 transforms the voltage at the antenna port 222 to a higher voltage at the receiver input port 224. There is a corresponding reduction in current and no power gain and no power consumed by the matching network 204.

When the matching network 204 is present, the noise figure, F, is given by the expression:

$$F \approx \left(1 + \left(\frac{\gamma}{G_M R_S |\beta|^2}\right)\right)$$

with overall system gain:

$$A_v \approx \beta G_M Z_{AUX}$$

Thus, for example, a voltage gain, β, of 10 would allow a reduction of $G_M$ by 100, with a significant corresponding reduction in power consumption, while achieving the same noise figure. The voltage gain may vary widely according to the particular design requirements for a given implementation, e.g., between 1.5 and 10.

Figure 3:
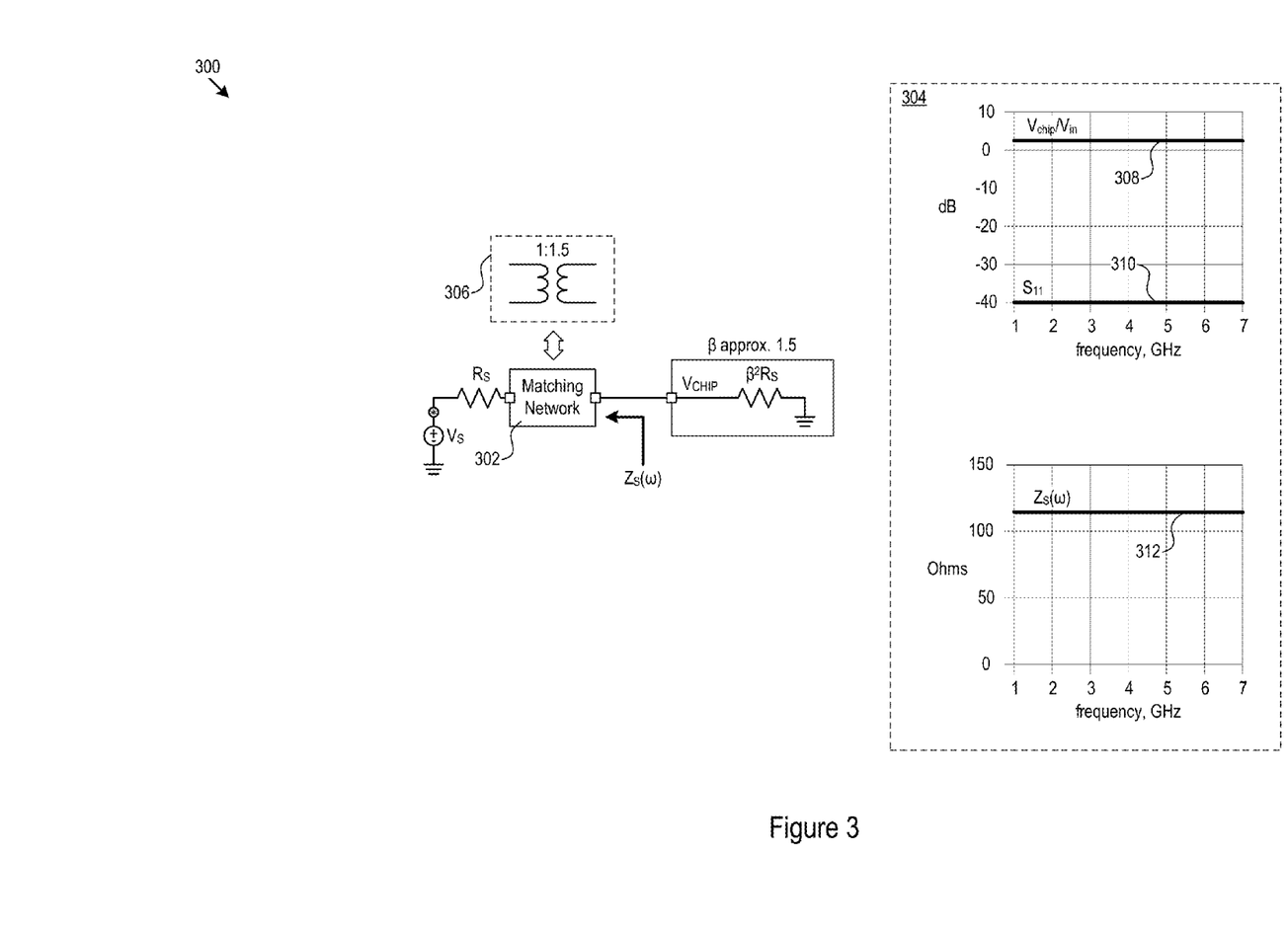
FIG. 3 is an example of a matching network and response.

FIG. 3 is an example 300 of a matching network 302 and its response characteristics 304. In particular, the matching network 302 is a step-up transformer 306 with a 1:1.5 turn ratio. The step-up transformer 306 provides a voltage gain of 1.5 with a corresponding current reduction of 1.5 so that no power is dissipated across the step-up transformer 306. The response characteristics 304 assume an ideal transformer and show constant performance across frequency for voltage gain 308, scattering parameter $S_{11}$ 310, and impedance 312.

Transceivers are often designed such that $S_{11}$ is less than −10 dB. When this condition is met, the receiver is generally considered "impedance matched," an important condition for any receiver that interfaces to an antenna. As demonstrated by the examples in FIGS. 3 and 4, the noise-cancelling receiver described here allows for impedance matching with low noise and reduced current requirements. While the noise cancelling receiver with passive gain may demonstrate somewhat reduced linearity and a potential narrowing of the receive bandwidth, both tradeoffs are still less than would be experienced in a conventional receiver with passive gain, e.g., a receiver with a common-source architecture experiencing inductive degeneration.

Figure 4:
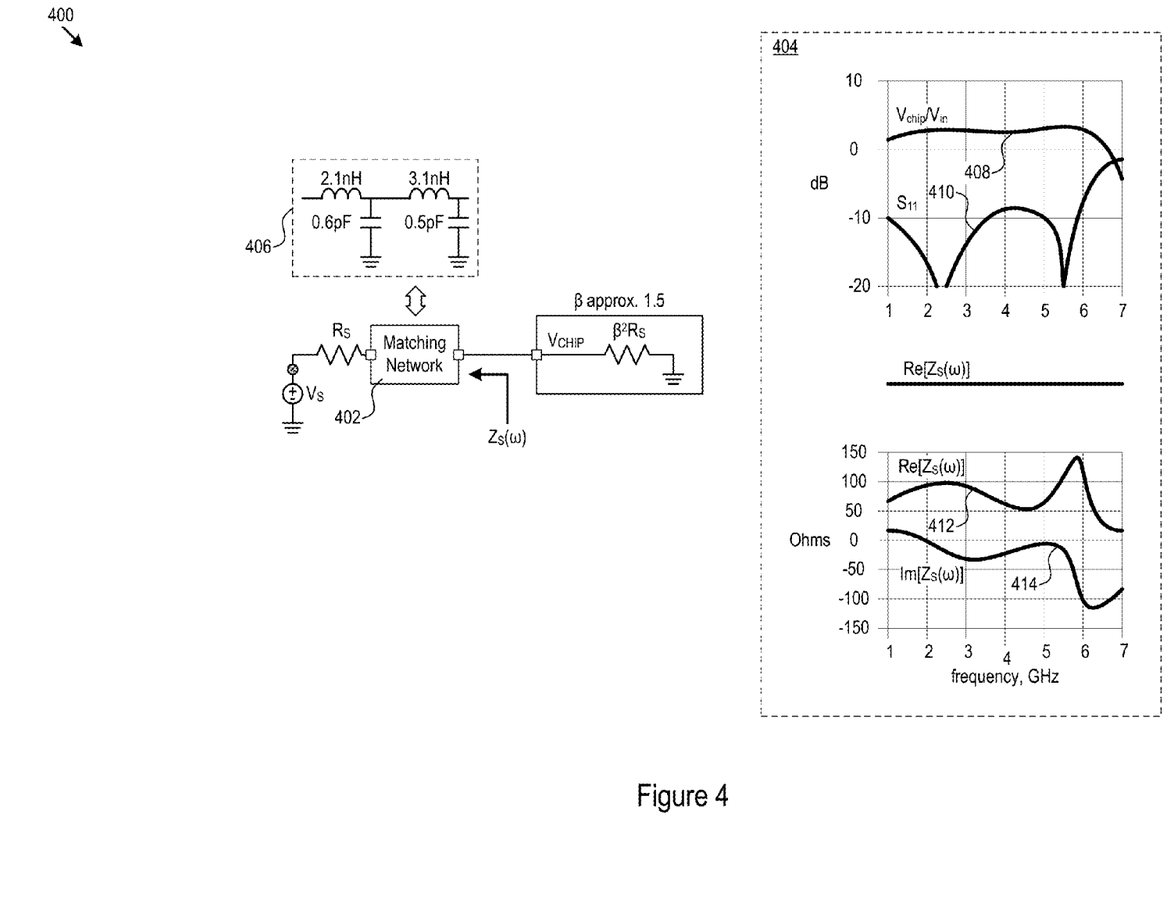
FIG. 4 is another example of matching network and response.

FIG. 4 is another example 400 of matching network 402 and its response characteristics 404. In particular, the matching network 402 is an inductor-capacitor ladder network 406. The ladder network 406, effectively, implements a lowpass filter with a bandwidth of approximately 0 to 6 GHz with gain of approximately 1.5. The response characteristics 404 show the variation across frequency for voltage gain 408, scattering parameter $S_{11}$ 410, and impedance, including the real component 412 and imaginary component 414.

Note that some implementations of the matching network 204 may provide a bandwidth specific implementation, e.g., a 6 GHz bandwidth between 0-6 GHz, or a 50 MHz bandwidth, or any other pre-determined bandwidth. Bandwidth specificity is often not a significant drawback, as the majority of receivers are narrowband in design because they are designed for specific applications with narrowband signaling. That is, the bandwidth specific implementation provides significant power reduction but does not hinder the operation of the application specific receiver.

Figure 5:
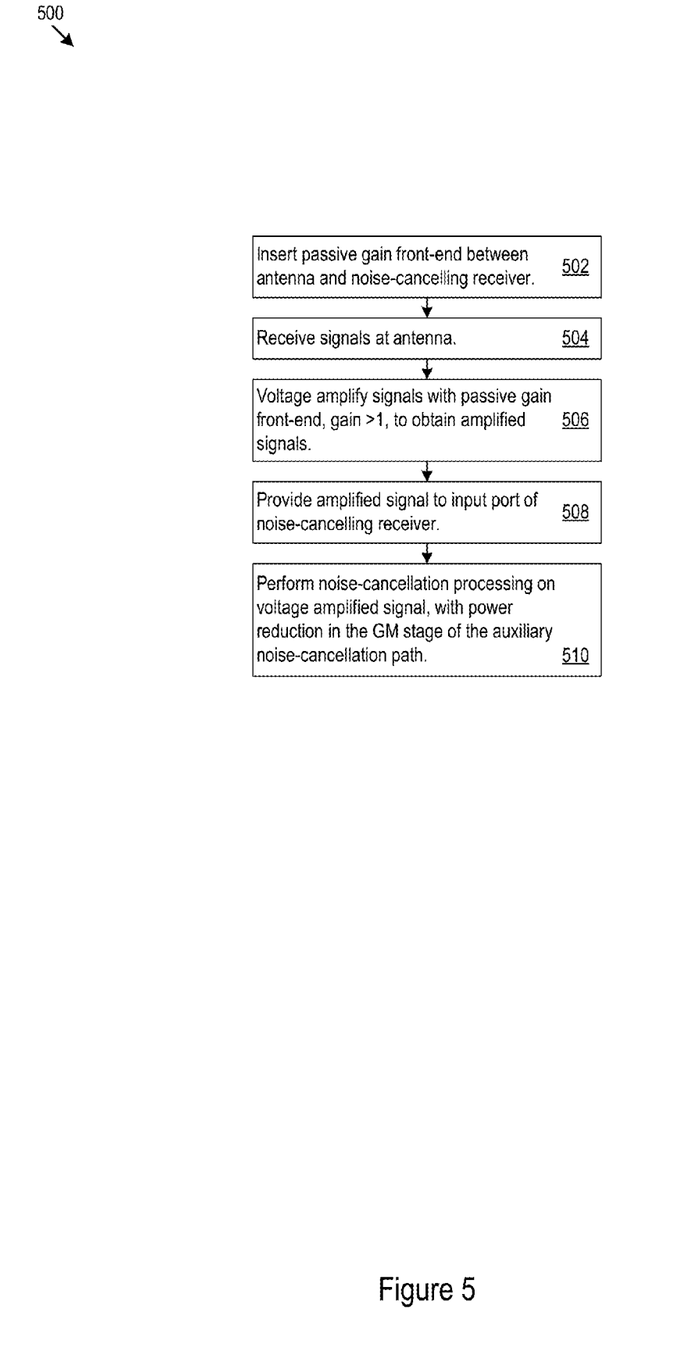
FIG. 5 is a flow diagram of processing received signals.

FIG. 5 shows the operation of the enhanced noise-cancelling receiver circuitry. In the circuit design, a passive gain front-end (e.g., the matching network 204) is inserted between an antenna and a noise-cancelling receiver 202 (502). The circuitry receives signals at the antenna (504). The passive gain front-end performs voltage amplification on signals (i.e., voltage gain >1), to obtain amplified signals (506). The voltage amplified signals are communicated to the input port 224 the noise-cancelling receiver 202 (508). In response, the noise-cancelling receiver 202 performs noise-cancellation processing on voltage amplified signals, e.g., using a main path 212 and an auxiliary path 214 with subsequent weighting and recombination (510). The noise-cancelling receiver 202 may exhibit dramatically reduced power consumption, e.g., because less amplification is applied in the transconductance stage 216 of the auxiliary path 214.

Various implementations have been specifically described. However, many other implementations are also possible.

What is claimed is:

1. A circuit comprising:
   an antenna port;
   a noise cancelling receiver comprising:
   main-path circuitry characterized by a main-path impedance; and
   auxiliary-path circuitry characterized by an auxiliary-path impedance and an auxiliary-path transconductance; and a passive matching network coupled between the antenna port and the noise cancelling receiver, the passive matching network comprising circuitry providing a gain that is greater than one and reducing a noise cancelling current in the noise cancelling receiver by a factor of at least a square of the gain, where:
a quotient of the main-path impedance divided by a Thevenin-equivalent impedance of a combination of an expected antenna load and the passive matching network matches a product of the auxiliary path impedance and the auxiliary-path transconductance.

2. The circuit of claim 1, where:
the passive matching network comprises an array of reactances.

3. The circuit of claim 2, where:
the array comprises an inductor-capacitor network.

4. The circuit of claim 1, where:
the passive matching network comprises a step-up transformer.

5. The circuit of claim 1, where:
the passive matching network implements a lowpass filter characteristic.

6. The circuit of claim 1, where:
the noise cancelling current requirement comprises a noise cancelling transconductance stage current requirement.

7. The circuit of claim 6, where:
the gain comprises an open-circuit voltage gain, $|\beta|$, that is configured to effect a noise figure, F, according to:

$$F \approx \left(1 + \left(\frac{\gamma}{G_M R_S |\beta|^2}\right)\right)$$

where $R_s$ represents an antenna impedance, $\gamma$ represents a constant, and $G_M$ represents the auxiliary path transconductance.

8. The circuit of claim 1, where:
the gain is between 1.5 and 10, inclusive.

9. A circuit comprising:
an antenna configured to obtain a received signal;
matching circuitry coupled to the antenna, the matching configured to apply a gain greater than one to the received signal to obtain an amplified signal and reduce a noise cancelling current by a factor of at least a square of the gain; and
a noise cancelling receiver characterized by the noise cancelling current, the noise cancelling receiver coupled to the matching circuitry and configured to receive the amplified signal, the noise cancelling receiver comprising:
  main-path circuitry characterized by a main-path impedance; and
  auxiliary-path circuitry characterized by an auxiliary-path impedance and an auxiliary-path transconductance, where:
a quotient of the main-path impedance divided by a Thevenin-equivalent impedance of a combination of the antenna and the matching circuitry matches a product of the auxiliary path impedance and the auxiliary-path transconductance.

10. The circuit of claim 9, where:
the matching circuitry comprises a passive matching network.

11. The circuit of claim 9, where:
the matching circuitry comprises a step-up transformer.

12. The circuit of claim 11, where:
the step-up transformer comprises a wideband step-up transformer.

13. The circuit of claim 9, where:
the matching circuitry comprises a reactive circuit.

14. The circuit of claim 13, where:
the reactive circuit comprises an inductor-capacitor circuit.

15. The circuit of claim 9, where:
the gain comprises an open-circuit voltage gain, $|\beta|$, that is configured to effect a noise figure, F, according to:

$$F \approx \left(1 + \left(\frac{\gamma}{G_M R_S |\beta|^2}\right)\right)$$

where $R_s$ represents impedance of the antenna, $\gamma$ represents a constant, and $G_M$ represents a transconductance in the noise cancelling receiver.

16. A circuit comprising:
amplification circuitry configured to apply a gain greater than one to a received antenna signal to produce an amplified signal; and
a noise cancelling receiver coupled to the amplification circuitry and configured to apply noise-cancelling processing to the amplified signal, the noise cancelling receiver comprising:
  main-path circuitry characterized by a main-path impedance; and
  auxiliary-path circuitry characterized by an auxiliary-path impedance and an auxiliary-path transconductance, where:
the amplification circuitry is characterized by an open-circuit voltage gain of beta, $|\beta|>1$, that reduces a noise cancelling current requirement in the noise cancelling receiver by more than a factor of $|\beta|$, where:
a quotient of the main-path impedance divided by a Thevenin-equivalent impedance of a combination of a modelled antenna load and the amplification circuitry matches a product of the auxiliary path impedance and the auxiliary-path transconductance.

17. The circuit of claim 16, where:
the noise cancelling current requirement comprises a transconductance stage current requirement; and
the open-circuit voltage gain is configured affect a noise figure for the noise cancelling receiver by a factor of:

$$\left(\frac{1}{|\beta|^2}\right).$$

18. The circuit of claim 16, where:
the open-circuit voltage gain is configured to effect a noise figure, F, according to:

$$F \approx \left(1 + \left(\frac{\gamma}{G_M R_S |\beta|^2}\right)\right)$$

where $R_s$ Represents Impedance of the Antenna, $\gamma$ Represents a Constant, and $G_M$ represents a transconductance in the noise cancelling receiver.

19. The circuit of claim 16, further comprising an antenna port configured to supply the modelled antenna load, where the amplification circuitry is coupled between the noise cancelling receiver and the antenna port.

20. The circuit of claim 19, where the amplification circuitry comprises a passive matching network.

* * * * *